(12) United States Patent
Kitagata

(10) Patent No.: US 10,802,779 B2
(45) Date of Patent: Oct. 13, 2020

(54) PRINT PROCESSING SYSTEM AND METHOD HAVING PRINT SERVER CONVERTS DOCUMENT DATA INTO PRINT DATA AND TO STORE THE PRINT DATA INTO PLURAL STORAGE SERVERS FOR PRINTING AT IMAGE PROCESSING APPARATUS

(71) Applicant: CANON KABUSHIKI KAISHA, Tokyo (JP)

(72) Inventor: Kei Kitagata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/283,593

(22) Filed: Feb. 22, 2019

(65) Prior Publication Data
US 2019/0265929 A1 Aug. 29, 2019

(30) Foreign Application Priority Data
Feb. 27, 2018 (JP) .................. 2018-033761

(51) Int. Cl.
G06F 3/12 (2006.01)
G06K 15/00 (2006.01)

(52) U.S. Cl.
CPC ............ *G06F 3/1268* (2013.01); *G06F 3/121* (2013.01); *G06F 3/1203* (2013.01); *G06F 3/1234* (2013.01); *G06F 3/1236* (2013.01); *G06F 3/1241* (2013.01); *G06F 3/1267* (2013.01); *G06F 3/1287* (2013.01); *G06F 3/1288* (2013.01); *G06F 3/1245* (2013.01); *G06K 15/408* (2013.01)

(58) Field of Classification Search
None
See application file for complete search history.

(56) References Cited

U.S. PATENT DOCUMENTS

| | | | | |
|---|---|---|---|---|
| 2011/0051193 A1* | 3/2011 | Okabe | ................ | H04N 1/00204 358/1.16 |
| 2011/0304884 A1* | 12/2011 | Kaneko | .............. | G03G 15/5079 358/1.15 |
| 2014/0313544 A1* | 10/2014 | Hasegawa | ............. | G06F 3/1288 358/1.15 |
| 2016/0170697 A1 | 6/2016 | Kitagata | | |

FOREIGN PATENT DOCUMENTS

JP 4509965 B2 7/2010

\* cited by examiner

*Primary Examiner* — Benny Q Tieu
*Assistant Examiner* — Haris Sabah
(74) *Attorney, Agent, or Firm* — Canon U.S.A., Inc. IP Division

(57) ABSTRACT

Information that is used for identifying a print data file having been obtained by an image processing apparatus is notified to a print server in response to an error occurring in processing for obtaining the print data files from a first storage server, and a print data file stored by a storage unit is obtained from a second storage server based on an index file including acquisition source information about a not-yet-obtained print data file, and print processing is executed.

10 Claims, 13 Drawing Sheets

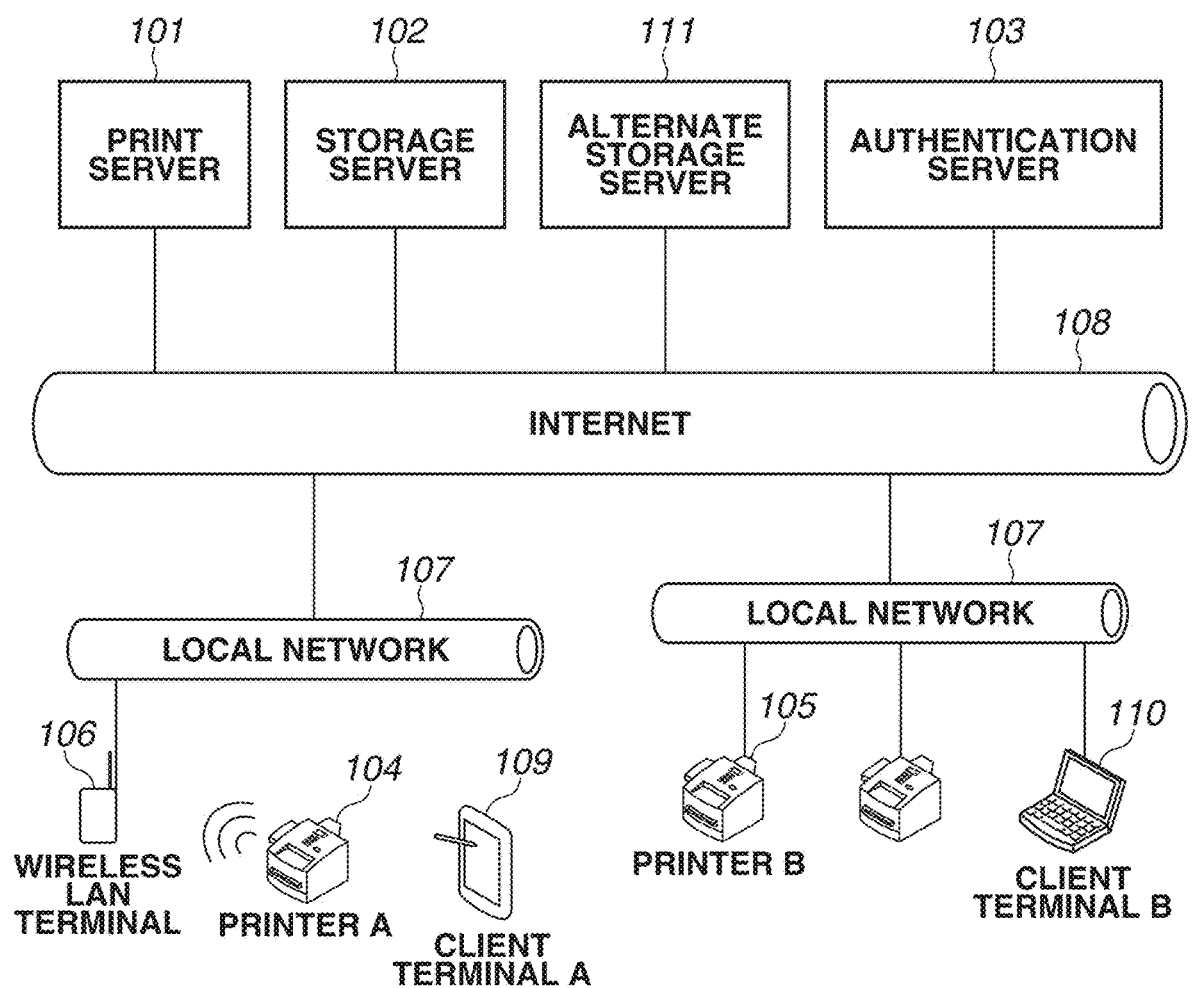

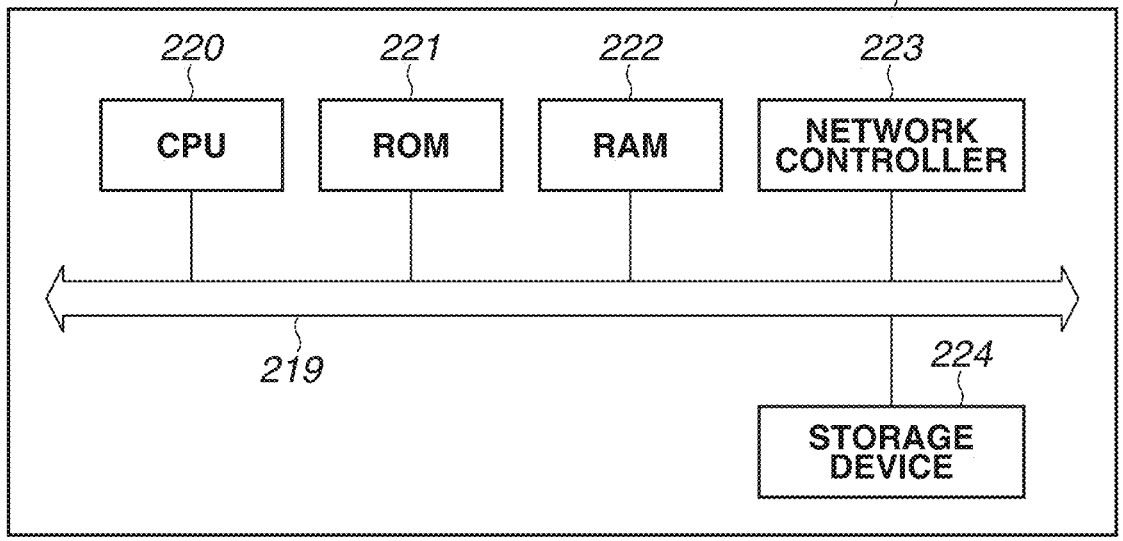
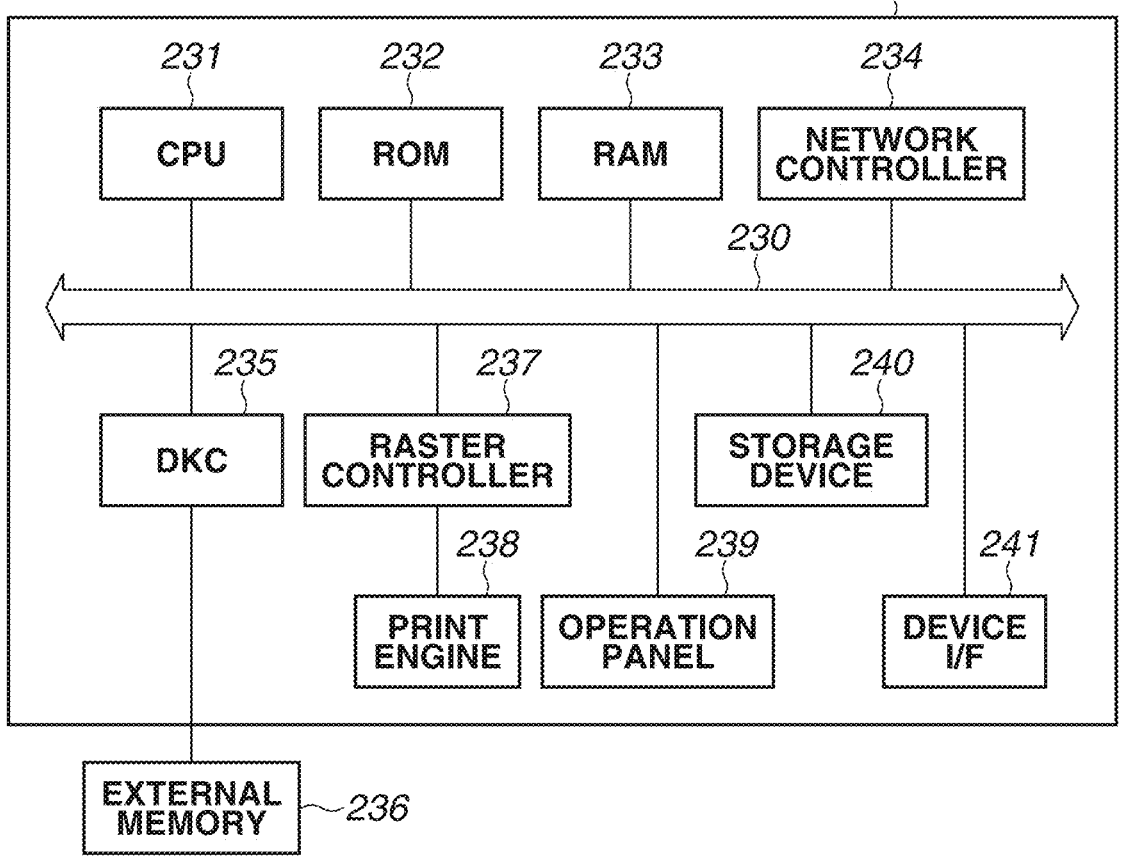

FIG.5A

```
LOGIN SCREEN                    ☒  ~500

USERNAME    [                ]  ~501

PASSWORD    [                ]  ~502

503~  [ LOGIN ]
```

FIG.5B

<DOCUMENT LIST>                                ~510

| 511 | DOCUMENT NAME (512) | STATUS (513) |
|---|---|---|
| ☐ | DOCUMENT A | ON STANDBY |
| ☐ | DOCUMENT B | PRINTING |
| ☐ | DOCUMENT C | ENDED NORMALLY |

[ PRINT ] ~514

FIG.5C

<PRINT SETTINGS>                               ~520

| 524 | | 522 |
|---|---|---|
| PRINTER NAME: | PRINTER A | CHANGE |
| PRINT RANGE: | ⦿ ALL  ○ PAGES | |
| SHEET SIZE: | SAME AS DOCUMENT SIZE ▼ | |
| NUMBER OF COPIES: | 1 | |
| PAGES PER SHEET: | 1 in 1 ▼ | |
| PRINTING METHOD: | TWO-SIDED PRINTING ▼ | |
| SHEET FEEDER: | AUTO ▼ | |
| COLOR MODE: | | |
| ... | ... | |

~521

[ PRINT ] ~523

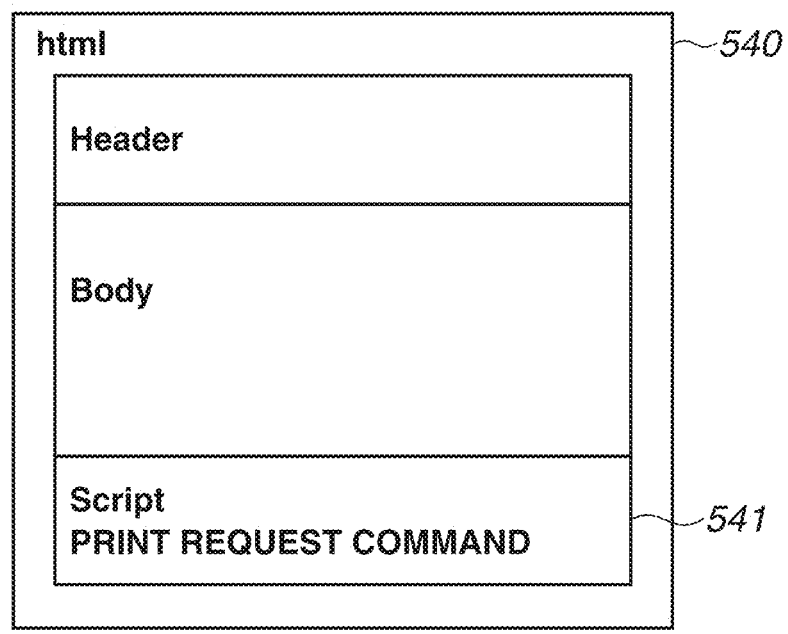

FIG.6

JOB INFORMATION 600

| | |
|---|---|
| 601 | JOB ID |
| 602 | DOCUMENT ID |
| 603 | USERNAME |
| 604 | DATE AND TIME OF ACCEPTANCE |
| 605 | PRINTER ID |
| 606 | INDEX FILE URL |
| | ... |

PRINTER INFORMATION 610

| | |
|---|---|
| 611 | PRINTER NAME |
| 612 | PRINTER ID |
| 613 | PRINTER URL |
| 614 | CONFIGURATION INFORMATION |
| 615 | COMPRESSION METHOD |
| | ... |

DOCUMENT INFORMATION 620

| | |
|---|---|
| 621 | DOCUMENT ID |
| 622 | DOCUMENT NAME |
| 623 | USERNAME |
| 624 | DOCUMENT URL |
| 625 | STATUS |
| | ... |

PRINT QUEUE INFORMATION 630

| | |
|---|---|
| 631 | JOB ID |
| 632 | INDEX FILE URL |
| 633 | PERMISSION TOKEN |
| 634 | PRINTER ID |
| | ... |

FIG.7

```
INDEX FILE (1)
{
    "version": 1,
    "dataList": [                              PRINT DATA FILE (1) URL
        "https://strage.srv.com/prw/tr2/oip/1004AA/93fc4966-8f68-4203-
        aa2f-056f83d42402/printjobs/7dca6de2-aae2-40df-83e8-
        6327aa31d93b/data/data-1.pdl?Policy=ppp&Signature=sss&Key-
        Pair-Id=kkk", ],
    "end": false
}
```
— 701

```
INDEX FILE (1)
{
    "version": 1,
    "dataList": [                              URL OF PRINT DATA FILE (1)
        "https://strage.srv.com/prw/tr2/oip/1004AA/93fc4966-8f68-4203-
        aa2f-056f83d42402/printjobs/7dca6de2-aae2-40df-83e8-
        6327aa31d93b/data/data-1.pdl?Policy=ppp&Signature=sss&Key-
        Pair-Id=kkk", "https://strage.srv.com/prw/tr2/oip/prt.AppPrint/93fc4966-8f68-
        4203-aa2f-056f83d42402/printjobs/7dca6de2-aae2-40df-83e8-
        6327aa31d93b/data/data-2.pdl?Policy=ppp&Signature=sss&Key-
        pair-Id=kkk"
                                               URL OF PRINT DATA FILE (2)
    ],
    "end": true
}
```
— 702

703

```
INDEX FILE (2)
{
    "version": 1,
    "dataList": [
        "https://strage.srv.com/prw/tr2/oip/2005BB/93fc4966-8f68-4203-aa2f-
        056f83d42402/printjobs/7dca6de2-aae2-40df-83e8-
        6327aa31d93b/data/data-2.pdl?Policy=ppp&Signature=sss&Key-Pair-
        Id=kkk"
                                               URL OF PRINT DATA FILE (2)
    ],
    "end": true
}
```
— 704

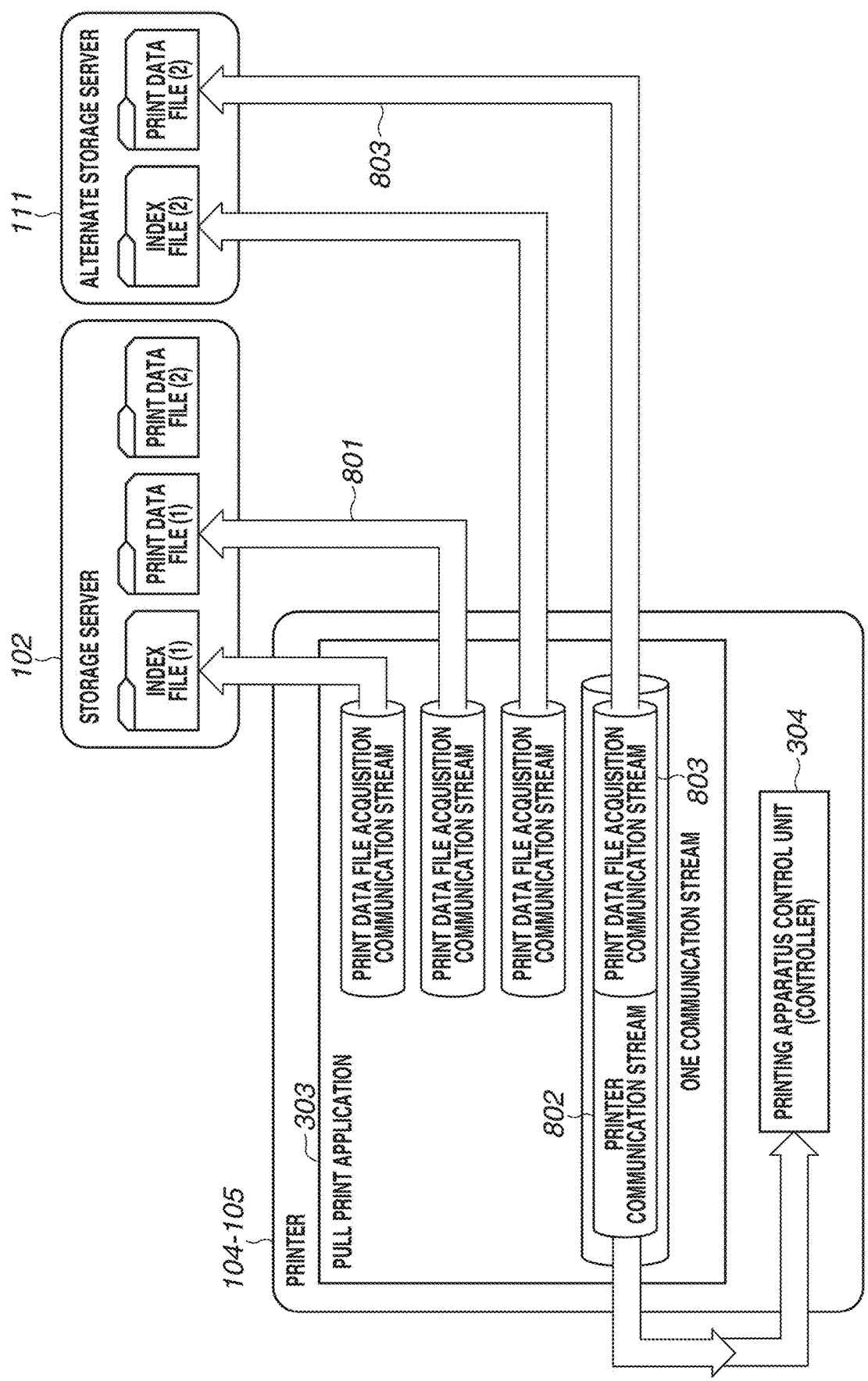

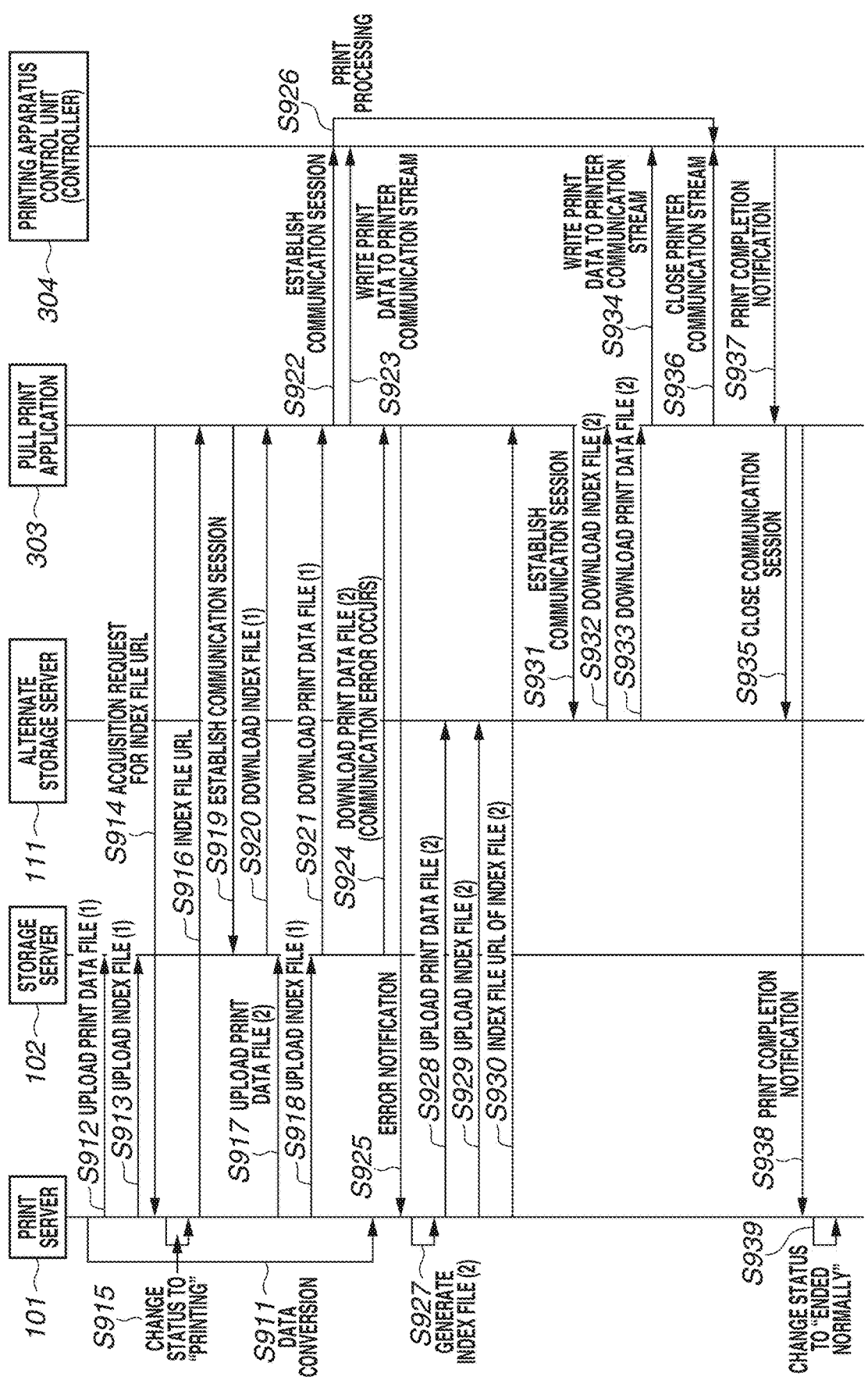

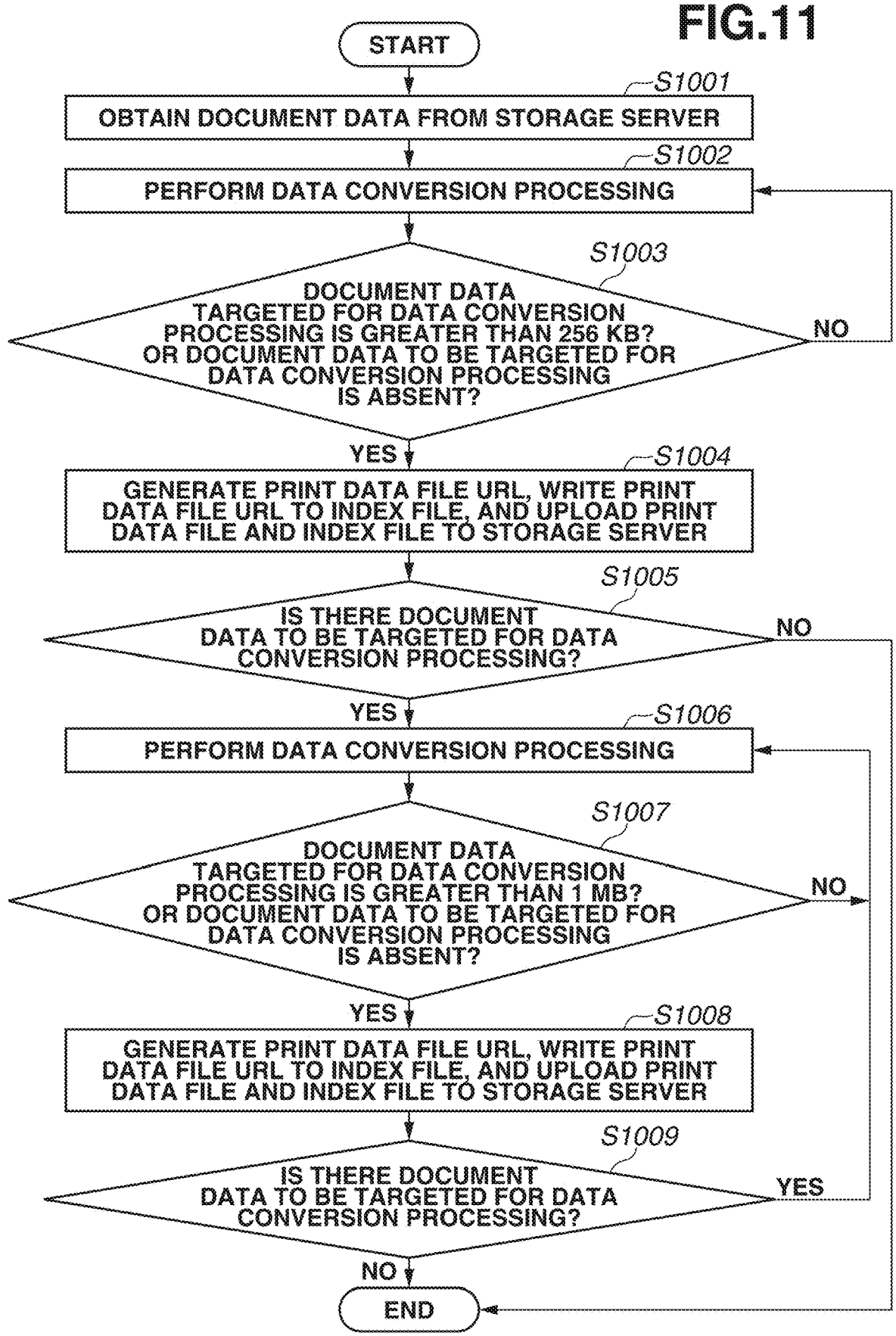

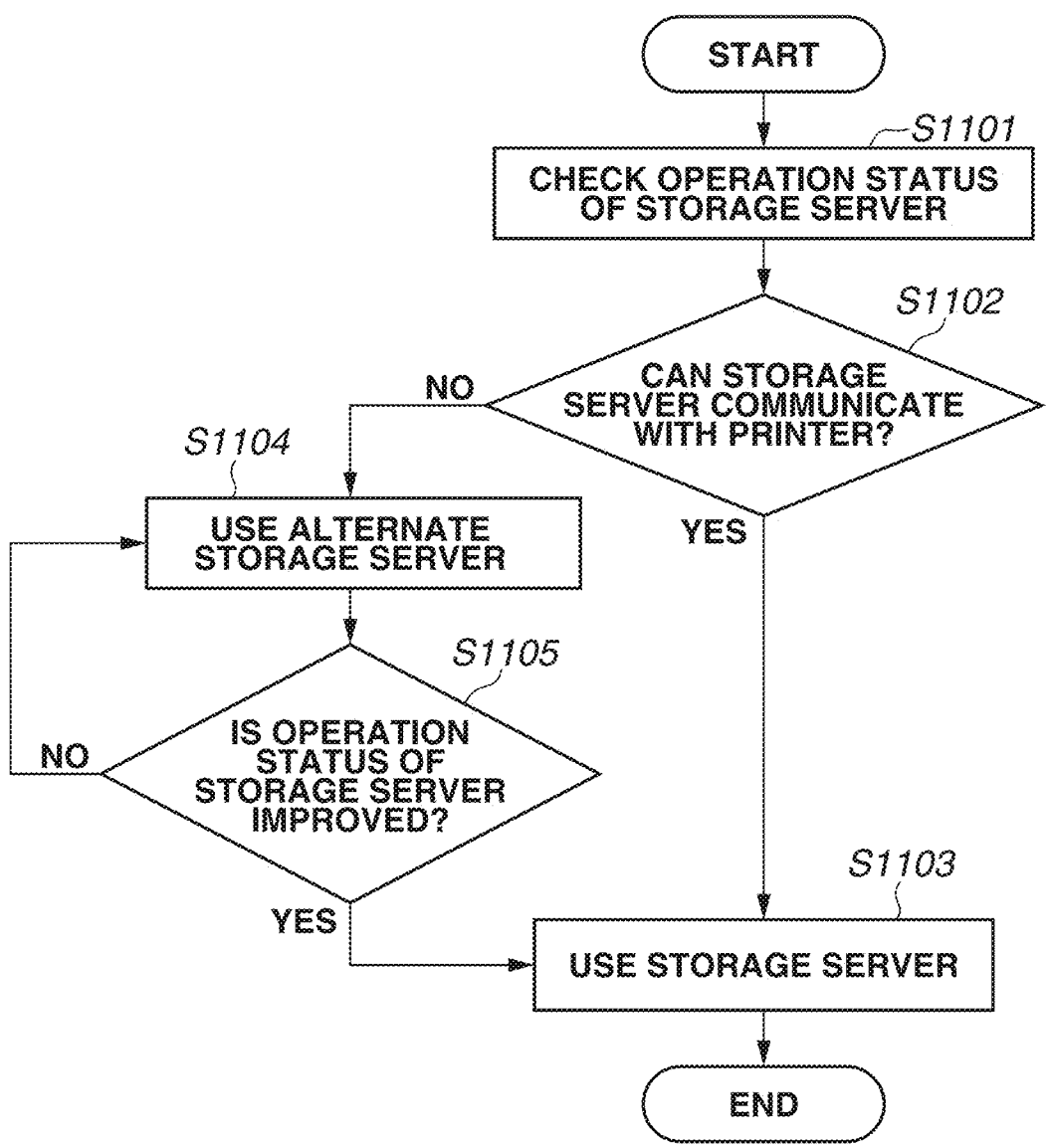

PRINT PROCESSING SYSTEM AND METHOD HAVING PRINT SERVER CONVERTS DOCUMENT DATA INTO PRINT DATA AND TO STORE THE PRINT DATA INTO PLURAL STORAGE SERVERS FOR PRINTING AT IMAGE PROCESSING APPARATUS

BACKGROUND OF THE INVENTION

Field of the Invention

The present invention relates to a print processing system for printing downloaded data by a printer and a control method.

Description of the Related Art

Business of providing cloud services using virtual servers on a cloud system has been developed in recent years. Examples of services include a storage service for storing data in a file form and a database service for providing database functions.

A printing system can be implemented by providing a print service and a data conversion service, using virtual servers on a cloud system. Such implementation has an advantage that hardware print servers do not need to be managed for each customer. Another advantage is that computing resources can be easily added based on load on the virtual servers.

As such cloud services become prevalent, a pull print environment in which a printer obtains print data from a cloud system via the Internet and performs printing is becoming increasingly common. In a pull print environment, a cloud system performs data processing on document data in a distributed manner using a lot of computing resources. Requests from a large number of clients can thus be processed at the same time. In managing print data using a cloud system, the cloud system needs a data conversion function for converting the print data into data formats interpretable by a wide variety of printers. The data conversion function is such a function implemented on a cloud-system that is equivalent to a conventional data conversion function that is performed on a data conversion driver included in a client terminal. Japanese Patent No. 4509965 discusses a job rendering system in which each of a plurality of servers performs data conversion processing for a different document type.

SUMMARY OF THE INVENTION

According to an aspect of the present invention, a print processing system includes a print server configured to convert document data into print data including a plurality of print data files, a first storage server, a second storage server, and an image processing apparatus configured to obtain the print data files and execute print processing, wherein the image processing apparatus comprises a notification unit configured to notify the print server of information identifying a print data file not yet obtained by the image processing apparatus, in response to an error occurring in processing for obtaining the print data files from the first storage server, wherein the print server comprises a generation unit configured to generate an index file based on the information notified by the notification unit, the index file including acquisition source information about the print data file not yet obtained by the image processing apparatus, and a storing unit configured to store the not-yet-obtained print data file into the second storage server, and wherein the image processing apparatus further comprises an execution unit configured to obtain the not-yet-obtained print data file from the second storage server based on the generated index file generated by the generation unit, and execute the print processing of the print data file obtained from the second storage server.

Further features of the present invention will become apparent from the following description of embodiments with reference to the attached drawings.

BRIEF DESCRIPTION OF THE DRAWINGS

FIG. 1 is a block diagram illustrating a configuration of a print processing system.

FIGS. 2A and 2B are hardware configuration diagrams of various apparatuses.

FIGS. 5A, 5B, 5C, 5D, and 5E are diagrams illustrating examples of web screens of a web browser.

FIG. 6 is a diagram illustrating data managed by the print server and a pull print application.

FIG. 7 is a diagram illustrating examples of index files.

FIG. 8 is a conceptual diagram illustrating a communication method of the pull print application.

FIG. 10 is a sequence diagram illustrating print processing by the web browser, the print server, and the pull print application.

FIG. 11 is a flowchart illustrating data conversion by the print server.

FIG. 12 is a flowchart illustrating processing procedure for selecting a storage server of a communication destination.

DESCRIPTION OF THE EMBODIMENTS

Figure 3:
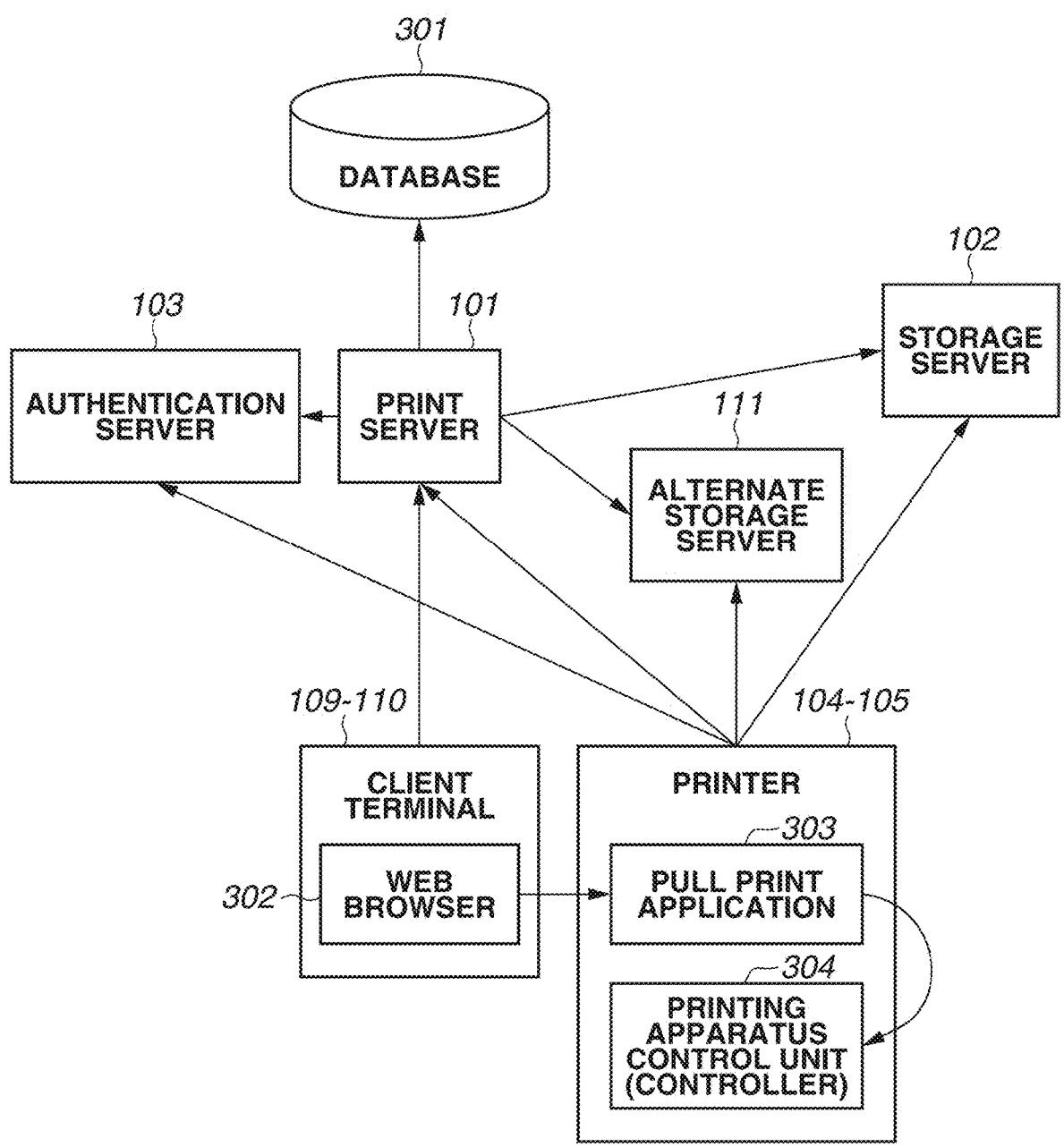
FIG. 3 is a diagram illustrating operation of various apparatuses constituting the print processing system.

To accelerate first printing of submitted document data, a cloud system can be configured to sequentially transmit print data of a page on which data processing has been completed to a printer for printing without waiting for completion of all the print data. Specifically, the printer appropriately downloads a piece of print data which is one of divided and generated pieces of print data, and performs printing of the downloaded print data.

During the operation, there may be a case in which the acquisition source server of the print data becomes unable to communicate due to, for example, a glitch in the acquisition source server or a glitch in a communication network. In such a case, since the printer cannot obtain the print data, discontinuation of the print processing is likely to occur.

An embodiment of the present invention is directed to a print processing system executing first printing, in which a printer can continue print processing even if an error occurs in obtaining print data.

According to the present embodiment, in the print processing system executing first printing, the printer can continue print processing even if an error occurs in obtaining print data.

Embodiments of the present invention will be described below with reference to the drawings.

<Network Configuration>

FIG. 1 is a diagram illustrating a network configuration of a print processing system according to an embodiment of the present invention. In FIG. 1, a plurality of printers and client terminals, including a printer A 104, a printer B 105, a client terminal A 109, and a client terminal B 110, is connected via local networks 107. FIG. 1 illustrates a case where there are three printers and two client terminals. However, the numbers of printers and client terminals are not limited thereto. An alternate storage server 111 has similar functions to those of a storage server 102. A detailed description of the alternate storage server 111 will therefore be omitted.

The printer A 104, the printer B 105, the client terminal A 109, and the client terminal B 110 access the Internet 108 via the local networks 107 and access a print server 101, the storage server 102, the alternate storage server 111, and an authentication server 103. The printer A 104, the printer B 105, the client terminal A 109, and the client terminal B 110 are connected to the local networks 107 using a wired connection or via a wireless local area network (LAN). According to the present embodiment, the printer A 104 and the client terminal A 109 are connected to the local network 107 via a wireless LAN terminal 106. The printer B 105 and the client terminal B 110 are connected to the local network 107 in a wired manner.

The wireless LAN terminal 106 is a wireless LAN base station having typical network and router functions. The wireless LAN terminal 106 provides a wireless LAN at home or in an office. The local networks 107 may be communication networks of any configuration capable of data transmission and reception. Examples the local networks 107 include a LAN and a wide area network (WAN). The means of communication from the client terminal A 109 and the client terminal B 110 to the various servers 101 to 103 may be different from the means of communication from the printer A 104 and the printer B 105 to the various servers 101 to 103. The printer A 104 and the printer B 105 are image processing apparatuses having at least a print function. Examples include a multifunction peripheral (MFP).

Examples of the client terminal A 109 and the client terminal B 110 include a desktop personal computer, a notebook personal computer, a mobile personal computer, a personal data assistant (PDA), and a mobile phone including a built-in program execution environment. The client terminal A 109 and the client terminal B 110 include a built-in program execution environment, such as a web browser (Internet browser, world wide web (WWW) browser, or a browser for WWW use). The following description will be given by using the printer A 104 and the client terminal A 109 as an example. A similar description applies to the printer B 105 and the client terminal B 110 or other combinations of printers and client terminals unless otherwise specified.

The print server 101 receives identification information identifying a document to be printed and identification information identifying the printer A 104 from the web browser of the client terminal A 109 along with a print request. The print server 101 then transmits a response including a print command for giving a print instruction to the web browser of the client terminal A 109. The web browser of the client terminal A 109 issues the print command to the printer A 104. The printer A 104 receives the print command from the web browser of the client terminal A 109, and obtains an index file (to be described below) describing a Uniform Resource Locator (URL) of the storage server 102. The URL is acquisition source information about print data. The printer A 104 accesses the URL described in the index file, obtains the print data from the storage server 102, and prints the print data.

The authentication server 103 stores authentication information for accessing the print server 101, such as a username, password, authentication token, and permission token.

<Hardware Configuration of Print Server>

FIG. 2A is a diagram illustrating an example of a hardware configuration of the print server 101, the storage server 102, the alternate storage server 111, and the authentication server 103. It will be understood that, unless otherwise specified, the present embodiment can be applied to a single apparatus or a system including a plurality of apparatuses as long as the functions according to the present embodiment can be executed. It will also be understood that, unless otherwise specified, the present embodiment is even applicable to a system that establishes connection and performs processing via a network, such as a LAN and a WAN, as long as the functions according to the present embodiment can be executed. According to the present embodiment, the components are described to be connected via a system bus 219. As an example, the hardware configuration of the print server 101 will be described below.

A central processing unit (CPU) 220 is a control unit of the print processing system. The CPU 220 executes, for example, application programs and an operating system of the print server 101, which are stored in a storage device 224. The CPU 220 controls temporary storage of information and files needed for program execution into a random access memory (RAM) 222. The CPU 220 also performs conversion processing into print data based on a print server program.

A read-only memory (ROM) 221 is a storage unit, and stores therein programs, such as a basic input/output (I/O) program, font data used for data conversion into print data, and various types of data for print processing and data conversion processing. The RAM 222 is a temporary storage unit, and functions as a main memory and a work area of the CPU 220. The storage device 224 is an external storage unit. The storage device 224 functions as a mass memory and stores, for example, the application programs and the operating system (OS). A network controller 223 is a network interface card (NIC). Data exchange with external apparatuses is performed via the network controller 223. The same applies to a network controller 234 to be described below.

<Hardware Configuration of Printers>

FIG. 2B is a hardware configuration diagram of the printer A 104 and the printer B 105. The hardware components are connected to a system bus 230. The description will be given of the printer A 104 as an example. A similar description applies to the printer B 105.

A CPU 231 controls the entire apparatus, and controls access to various devices connected to the system bus 230 in a centralized manner. Such control is based on a control program stored in a ROM 232, or a control program and resource data (resource information) stored in an external memory 236 connected via a disk controller (DKC) 235.

A RAM 233 functions as a main memory and a work area of the CPU 231. The RAM 233 is configured so that its memory capacity can be extended by an optional RAM connected to a not-illustrated communication port. A communication port refers to an endpoint of a Transmission Control Protocol (TCP) connection. An OS on the connection host manages communication ports by numbers.

A storage device 240 is an external storage unit functioning as a mass memory. An operation panel 239 (operation unit) displays a screen and accepts user's operation instructions via the screen. The operation panel 239 also includes buttons for making operations, such as setting an operation mode of the printer A 104, displaying an operation status of the printer A 104, and specifying content data to be printed, and a display unit, such as a liquid crystal panel.

A print engine 238 uses conventional printing techniques. Examples of suitable systems of implementation include an electrophotographic (laser beam) system, an inkjet system, and a sublimation (thermal transfer) system.

A raster controller 237 is a controller that converts print data of page description language (PDL) format into image data. A device interface (I/F) 241 is a connection I/F capable of Universal Serial Bus (USB) connection with an external apparatus.

<System Configuration of Print Processing System>

Operations of various apparatuses will be described with reference to a configuration diagram of the print processing system of FIG. 3. Such operations are implemented in such a manner that the CPUs executes programs stored in the memories of the respective apparatuses.

The print server 101 generates a URL that is acquisition source information about document data, and transmits the generated URL to other servers. The generated URL indicates an upload location of the document data in the storage server 102. Receiving a print request from the web browser 302, the print server 101 uploads the document data to be printed to the generated URL. If the print server 101 receives a notification of completion of the upload, the print server 101 stores document information 620 about the uploaded document data into a database 301.

The print server 101 obtains document data identified by a document identifier (ID) 621 received with a print request from the storage server 102, and converts the document data into print data. After generating print data, the print server 101 generates a download URL on the storage server 102. The print server 101 writes the download URL to an index file, and uploads the print data to the download URL. The print server 101 then uploads the index file to the storage server 102.

The print server 101 transmits an authentication token included in a request from the web browser 302 to the authentication server 103. The authentication server 103 verifies the authentication token. If the request does not include an authentication token, the print server 101 redirects the request to the authentication server 103. The authentication server 103 then transmits a login screen 500 to the web browser 302. FIG. 5A illustrates an example of the login screen 500.

The authentication server 103 verifies a username and password input via the login screen 500 by collating the username and password with usernames and passwords stored in the authentication server 103. If the verification is successful, the authentication server 103 issues an authentication token to be linked with user information, and transmits the authentication token to the web browser 302.

The web browser 302 transmits a request including the authentication token to the print server 101, and displays a web screen based on a response from the print server 101. FIGS. 5B to 5E illustrate examples of the web screen. Details of the web screens will be described below.

The authentication server 103 issues a permission token for accessing the print server 101 to a pull print application 303 of a printer. The authentication server 103 verifies a permission token included in a request from the pull print application 303 to the print server 101.

If the permission token is verified, the pull print application 303 obtains the index file. The pull print application 303 obtains the print data from the storage server 102 based on the index file, and transmits the print data to a printing apparatus control unit 304. The printing apparatus control unit 304 performs printing using the print data. The system configuration diagram and operation of the print processing system have been described above.

<Software Configuration of Print Server>

Figure 4A:
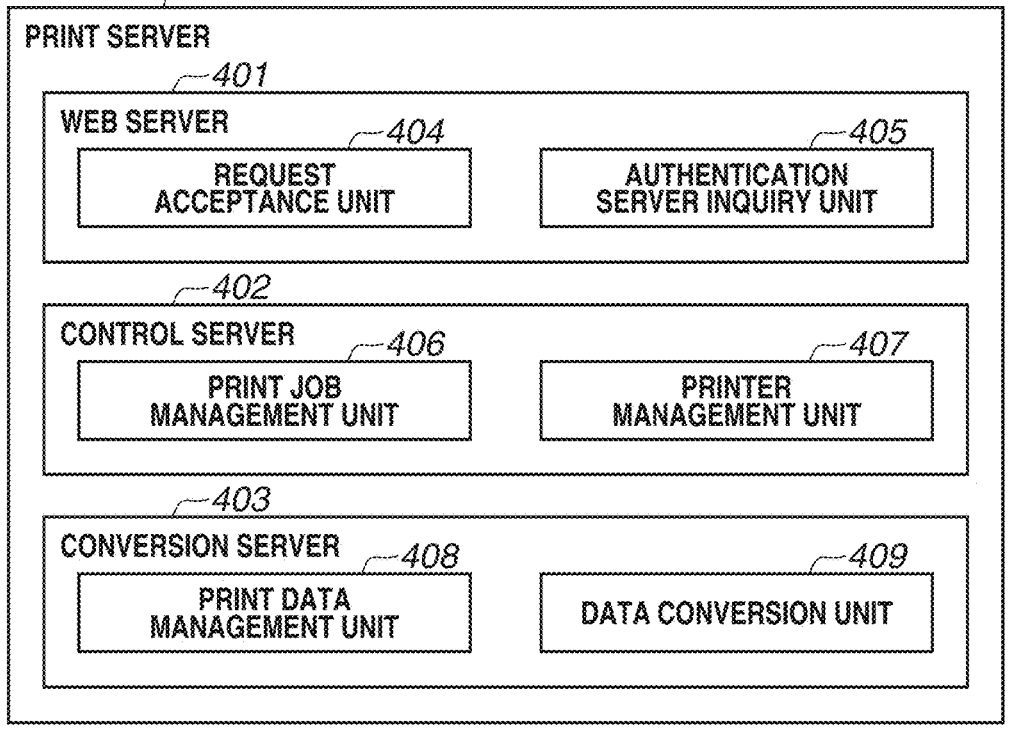
FIGS. 4A and 4B are software configuration diagrams of a print server and printers.

FIG. 4A is a software configuration diagram of the print server 101 according to the embodiment of the present invention. Various functions of the print server 101 are stored in the storage device 224 illustrated in FIG. 2A, and loaded into the RAM 222 and executed by the CPU 220. The functions of the print server 101 when the print server 101 receives a request from outside will be described with reference to FIG. 4A.

The print server 101 includes a web server 401, a control server 402, and a conversion server 403. The web server 401 receives a request. The control server 402 manages documents, print jobs, and printer information, and controls print processing. The conversion server 403 converts document data into print data. The servers 401, 402, and 403 are respective independent programs, and can be located in different print processing systems. Each of the programs is arranged in a different network-connected print processing system and communicate with each other. In the following description, the programs are described to be arranged in the same print processing system (print server 101). Each of the programs may be configured on a different independent servers. The number and configuration of physical servers having the functions of the programs are not limited in particular.

The web server 401 includes a request acceptance unit 404 and an authentication server inquiry unit 405. The request acceptance unit 404 has a function of receiving a submission or print request for document data, and a print data acquisition request. The authentication server inquiry unit 405 has a function of transmitting a verification request for a token included in a request to the authentication server 103 when the request acceptance unit 404 receives the request.

The control server 402 includes a print job management unit 406 and a printer management unit 407. The print job management unit 406 has a function of generating document information 620 to be described below based on a submission request for received document data, and storing the document information 620 into the database 301. The print job management unit 406 also has a function for generating job information 600 based on a received print request, and storing the job information 600 into the database 301.

The printer management unit 407 has a function of managing information (printer information 610 to be described below) about the printer A 104, and providing the printer information 610 to the print job management unit 406.

The conversion server 403 includes a print data management unit 408 and a data conversion unit 409. The print data management unit 408 has a function of downloading document data from the storage server 102 based on a print data conversion request from the control server 402. The data conversion unit 409 has a function of converting the document data downloaded by the print data management unit 408 into print data. The print data management unit 408 further generates print data file URLs on the storage server 102 for print data files generated by the data conversion unit 409. The print data management unit 408 here generates as many print data file URLs as the number of generation-completed print data files. The print data management unit 408 then generates an index file describing the print data file URLs. The functions of the print server 101 have been described above.

<Software Configuration of Printers>

Figure 4B:
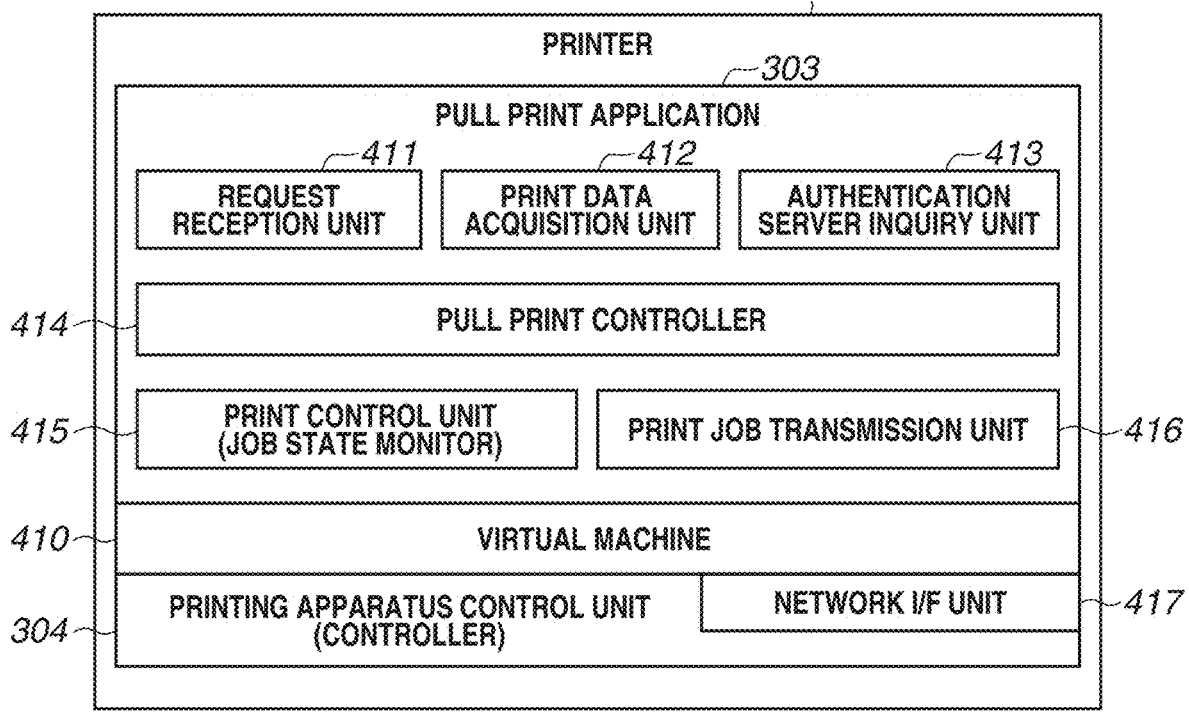

A software configuration diagram of the printer A 104 and the printer B 105 will be described with reference to FIG. 4B. Since the printer A 104 and the printer B 105 have the same software configuration, the printer A 104 will be described as an example.

Various functions of the printer A 104 are stored in the storage device 240, and loaded into the RAM 233 and executed by the CPU 231. Operation of the functions of the printer A 104 when a request is received will be described along with the software configuration of the printer A 104.

The pull print application 303 is application software running on a virtual machine 410. A pull print controller 414 manages operations on the entire pull print application 303. Operation instructions to various units are executed via the pull print controller 414.

A request reception unit 411 has a function of receiving a print request from the web browser 302. The request reception unit 411 transmits print request information to a print data acquisition unit 412 based on the received print request. The print request information includes a job ID 601 and a printer ID 605. The print data acquisition unit 412 has a function of obtaining print data based on the print request information, and managing a permission token obtained from the authentication server 103 as print queue information 630.

An authentication server inquiry unit 413 has a function of managing a client certificate granted by the authentication server 103. By using the client certificate, the authentication server inquiry unit 413 obtains a permission token from the authentication server inquiry unit 405.

A print control unit 415 has a function of inquiring the printing apparatus control unit 304 of the state of a print job via the virtual machine 410 during printing. A print job transmission unit 416 has a function of storing print data obtained from the print data acquisition unit 412 into a transmission buffer stream to be described below and transmitting the print data to the printing apparatus control unit 304. The printing apparatus control unit 304 is a controller that performs printing by using the print data.

A network I/F unit 417 has a function of mediating the transmission and reception of the print data between the printing apparatus control unit 304 and the print job transmission unit 416. The functions of the printer A 104 and the operation of various functions in receiving a request have been described above.

<Various Types of Information>

Information managed by the servers will be described with reference to FIG. 6. Job information 600 is generated by the print job management unit 406 and managed in the database 301. Specifically, the job information 600 includes a job ID 601, a document ID 602, a username 603, a date and time of acceptance 604 of printing, a printer ID 605, and an index file URL 606. The job ID 601 identifies a print job. The document ID 602 corresponds to a document ID 621 of document information 620. The username 603 is linked with an authentication token. The printer ID 605 corresponds to a printer ID 612 of printer information 610.

Printer information 610 is managed by the printer management unit 407. Specifically, the printer information 610 includes a printer name 611, a printer ID 612, a printer URL 613, configuration information 614, and a compression method 615. The printer ID 612 identifies the printer A 104. The printer URL 613 is intended for the web browser 302 to transmit a print request to the printer A 104. The compression method 615 indicates a compression method in which print data can be handled. The configuration information 614 refers to functions of the printer A 104, such as a two-sided print function and a color function, which are displayed as items of print settings 521 on a print setting screen 520.

Document information 620 is managed in the database 301. The document information 620 includes a document ID 621, a document name 622, a username 623, a document URL 624, and a status 625. The document ID 621 identifies document data. The username 623 is linked with an authentication token. The document URL 624 is used to upload the document data to the storage server 102. The document URL 624 includes the document ID 621. The status 625 is information indicating statuses, such as "receiving", "on standby", "in print queue", "printing", "ended normally", "terminated with error", and "terminated for unknown reason".

Print queue information 630 is managed by the print data acquisition unit 412. The print queue information 630 includes a job ID 631, an index file URL 632, a permission token 633, and a printer ID 634.

<Processing for Storing Document Data into Storage Server>

Processing for storing document data into the storage server 102 will be described. The web server 401 of the print server 101 receives a submission request for document data from the printer A 104, the printer B 105, or the web browser 302. If the request acceptance unit 404 of the web server 401 receives a submission request, the authentication server inquiry unit 405 transmits a verification request for an authentication token to the authentication server 103. If the authentication token included in the submission request is validated, the request acceptance unit 404 transmits the submission request to the control server 402.

The print job management unit 406 of the control server 402 receives the submission request, and generates document information 620 and stores the document information 620 into the database 301. The document URL 624 included in the document information 620 includes a document ID 621. The print job management unit 406 changes the status 625 of the document information 620 to "receiving", and transmits the document URL 624 to the web server 401. The web server 401 then transmits the document URL 624 to the source of the submission request.

The print server 101 uploads the document data to a submission location identified by the document URL 624 in the storage server 102. If the document data is uploaded, an upload completion notification is transmitted to the print server 101. If the web server 401 of the print server 101 receives the upload completion notification, the control server 402 changes the status 625 of the document information 620 to "on standby". The processing for storing document data into the storage server 102 has been described above.

<Processing for Transmitting Print Request Via Web Browser 302>

Web screens that are generated by the web server 401 of the print server 101 and displayed by the web browser 302 of the client terminal A 109 and processing for transmitting a print request to be executed via the web screens will be described with reference to FIGS. 5A, 5B, 5C, 5D, and 5E.

If a document list request is transmitted from the web browser 302 to the print server 101, the print server 101 generates a document list screen 510 by using document information 620, and transmits the document list screen 510 to the web browser 302. FIG. 5B illustrates an example of the document list screen 510. The document list screen 510 includes a document selection checkbox 511, a document name 512, a status 513, and a print button 514. The status 513 corresponds to the status 625 of the document information 620. The document selection checkbox 511 includes checkboxes for selecting a document to be printed. The document selection checkbox 511 may be configured in such a manner that a plurality of documents can be selected. The mode for selecting documents to be printed is not limited in particular. If the web browser 302 detects the pressing of the print button 514, the document information 620 about the document(s) selected by the document selection checkbox 511 is transmitted to the print server 101.

After receiving the document information 620, the print server 101 generates the print setting screen 520 using the printer information 610 and transmits the print setting screen 520 to the web browser 302. FIG. 5C is a diagram illustrating an example of the print setting screen 520. The print setting screen 520 is a setting screen of the print settings 521. A printer name 524 indicates the name of the printer that performs the printing.

If the web browser 302 detects the pressing of a change button 522, the web browser 302 transmits a request to print server 101. In response to receipt of the request, the print server 101 generates a printer list screen 530 using the printer information 610 and transmits the printer list screen 530 to the web browser 302. FIG. 5D is a diagram illustrating an example of the printer list screen 530. The printer list screen 530 includes a printer selection radio button 532, a printer name 531, and a change button 533. If the web browser 302 detects the pressing of the change button 533, the web browser 302 transmits the printer information 610 about the printer selected by the printer selection radio button 531 to the print server 101.

The print server 101 updates the print setting screen 520 to change the printer name indicated in the printer name 524 to the printer name selected by the printer selection radio button 531, and transmits the updated print setting screen 520 to the web browser 302. In other words, the user can change and select a desired printer using the print setting screen 520 and the printer list screen 530.

If the web browser 302 detects the pressing of a print button 523 on the print setting screen 520, the web browser 302 transmits the print settings 521, the printer name 524, and the document information 620 about the document(s) selected by the document selection checkbox 511 to the print server 101. The print setting screen 520 retains the document information 620 about the document(s) selected on the document list screen 510 as hidden screen parameters.

The processing for transmitting a print request the print server 101 via the web browser 302 has been described above.

<Communication Method Between Printers and Storage Servers>

A communication method between the printers and the storage servers will be described with reference to FIG. 8. FIG. 8 is a conceptual diagram illustrating how the print job transmission unit 416 transmits print data files to the printing apparatus control unit 304 in one communication session while the print data acquisition unit 412 of the pull print application 303 obtains the print data files from the storage server 102. A communication session refers to a set of TCP connections between hosts, or a communication connection from start to end of communication.

In the present embodiment, communications between the storage server 102, the pull print application 303, and the printing apparatus control unit 304 are implemented by stream communication that is a communication method in which a transmission destination and transmission order of data are guaranteed. A stream (or communication stream) refers to an object-like representation of movement of data exchanged in a communication session and represents a data flow. A concrete description will be given with reference to FIG. 8.

The pull print application 303 transmits print data received from the print server 101 to the printing apparatus control unit 304. To transmit the print data, a communication session needs to be established between the pull print application 303 and the printing apparatus control unit 304 via a communication port. By transmitting and receiving print data in the established communication session, the print data can be processed as a single print job. If the communication session is disconnected during transmission and reception of the print data, pieces of the print data that are originally a single piece of data are however processed as different print jobs. According to the present embodiment, the communication method illustrated in FIG. 8 is then used.

After execution of print data conversion, the print server 101 instantly uploads the generated print data to the storage server 102 as a print data file. In the diagram, print data files uploaded to the storage server 102 are illustrated as "print data file (1)" and "print data file (2)".

The pull print application 303 transmits the print data files (1) and (2) to the printing apparatus control unit 304 in one communication session. Here, the pull print controller 414 and the printing apparatus control unit 304 establish a communication session for implementing a printer communication stream 802 in advance, and maintain a communication stream with a print data file acquisition communication stream 801.

Maintaining a communication stream refers to a state where a communication session (TCP connection) established between the pull print controller 414 and the storage server 102 serving as hosts and a communication session established between the pull print controller 414 and the printing apparatus control unit 304 implement a continuous communication stream. The former communication session will be referred to as a first communication session, and the latter a second communication session. A TCP connection can be established by exchanging a permission request for connection establishment and a permission acknowledgment between communication ports on hosts. A TCP connection is also established between the first and second communication sessions.

The print data file acquisition communication stream 801 is a communication between the print data acquisition unit 412 of the printer A 104 and the storage server 102. Specifically, the print data file acquisition communication stream 801 is a communication via the Internet. The communication protocol is Hypertext Transfer Protocol Secure (HTTPS) and so on.

The printer communication stream 802 is a communication between the print job transmission unit 416 and the network I/F unit 417 of the printing apparatus control unit 304. Specifically, the printer communication stream 802 is a local network communication from a communication port of the printer A 104 to another communication port of the printer A 104. The communication protocol is a raw protocol.

The print job transmission unit 416 transmits a print data file received from the print data acquisition unit 412 to the printing apparatus control unit 304 via the network I/F unit 417. The print job transmission unit 416 stores part of the print data into a transmission buffer stream and thereby transmits part of the print data to the printing apparatus control unit 304 while receiving the print data file from the storage server 102. Part of the print data refers to data in units of packets obtained by subdividing the print data file, and is temporarily stored in the transmission buffer stream. In such a manner, the pull print application 303 transmits the print data to the printing apparatus control unit 304. This enables time-consuming preprocessing by the print engine 238 to be started earlier so that the printer A 104 can execute first printing earlier. To accelerate first printing, the print job transmission unit 416 transmits the print data to the printing apparatus control unit 304 in one communication session while receiving the print data files stored in the storage server 102.

A communication method for a case, for example, where a communication error occurs between the pull print application 303 and the storage server 102 and the pull print application 303 becomes unable to access the storage server 102 will be described with reference to FIG. 8. According to the present embodiment, the print data file (2) among the print data files uploaded to the storage server 102 has also been uploaded to the alternate storage server 111 by processing to be described below. In addition, the print data file (2) is a print data file that the printer A 104 fails to obtain due to the communication error.

If an error occurs, the printer A 104 obtains an index file from the print server 101, and establishes a communication session with the alternate storage server 111. In the established communication session, the print data acquisition unit 412 implements a print data file acquisition communication stream 803 for obtaining a print data file described in the index file. The pull print controller 414 replaces the print data file acquisition communication stream 801 with the print data file acquisition communication stream 803 while maintaining the print data file acquisition communication stream 801 with the storage server 102, and changes the connection from the existing printer communication stream 802 to the print data file acquisition communication stream 803 to maintain one communication stream. Specifically, changing connection of a communication stream refers to establishing a communication session (third communication session) between the alternate storage server 111 and the pull print application 303 and disconnecting the communication session between the storage server 102 and the pull print application 303. The communication session is disconnected by exchanging a termination application and a termination acknowledgment for the TCP connection between the hosts. The same applies to changing connection between the print data file acquisition communication stream 801 and the printer communication stream 802.

The communication method between the storage servers and the printers has been described above. The processing illustrated in FIG. 8 can accelerate first printing. Even if an error occurs in obtaining a print data file, the printer A 104 can perform print processing as a single print job.

<Print Start Processing Procedure>

Figure 9:
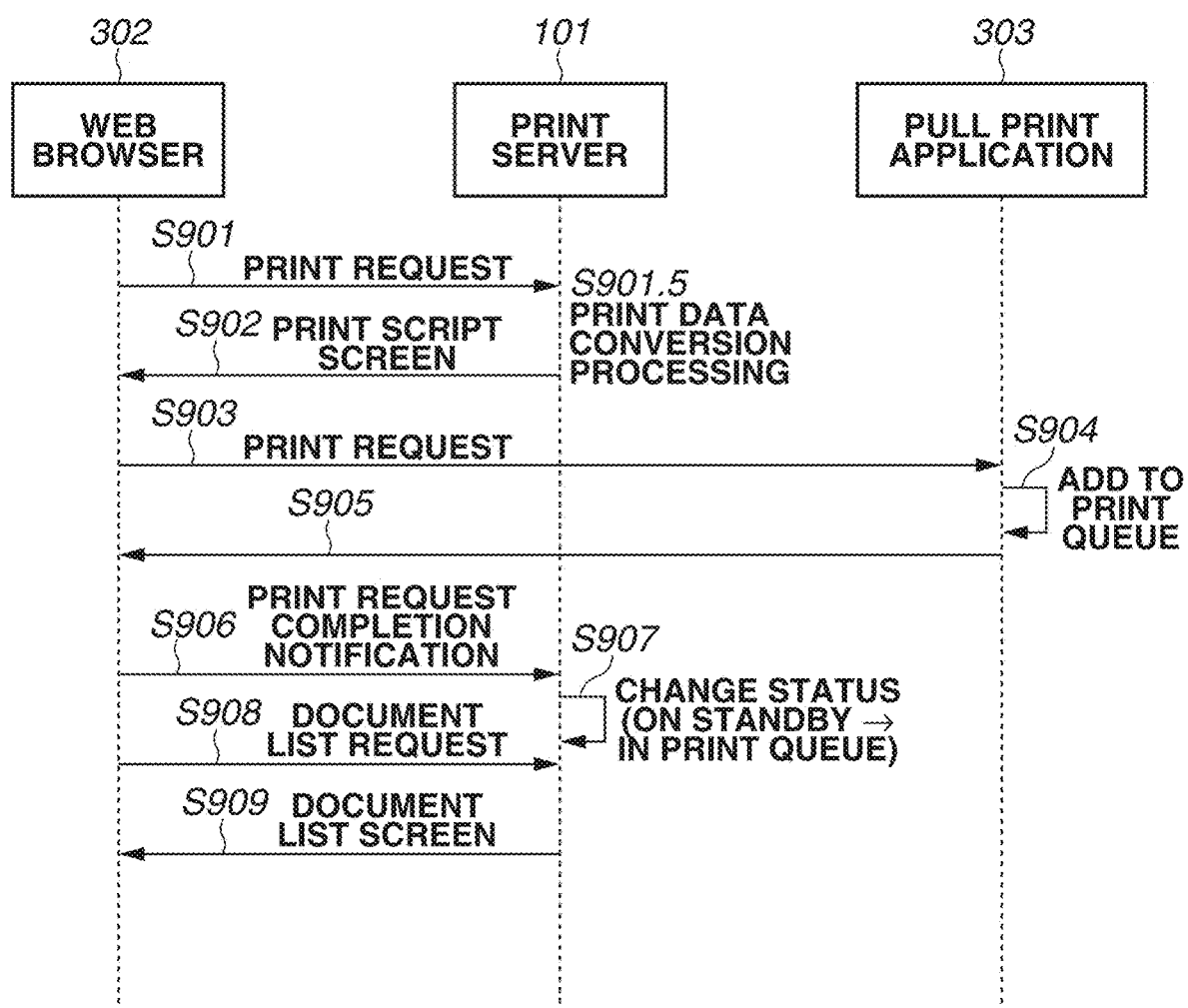
FIG. 9 is a sequence diagram illustrating print start processing.

Print start processing according to the embodiment of the present invention will be described with reference to FIG. 9.

In step S901, the web browser 302 transmits a print request to the print server 101. The print request includes a document ID 621 and a printer ID 612. The print request of step S901 is transmitted to the print server 101 in response to pressing of the print button 523 (FIG. 5C).

The control server 402 of the print server 101 receives the print request. The print job management unit 406 of the control server 402 generates job information 600 based on the print request, and stores the job information 600 into the database 301.

The document ID 621 included in the print request is linked with the document name 622 of the document information 620 corresponding to the document name 512 on the document list screen 510. The printer ID 612 included in the print request corresponds to the printer name 524 on the print setting screen 520 and is linked with the printer name 611 of the printer information 610.

The print job management unit 406 obtains the printer information 610 corresponding to the printer ID 612 from the printer management unit 407. The print job management unit 406 transmits the configuration information 614, the compression method 615, the document URL 624, and the job ID 601 to the conversion server 403, and gives an instruction for conversion into print data. In step S901.5, the conversion server 403 starts print data conversion processing into print data.

In step S902, the print server 101 transmits a print script screen 540 (FIG. 5E) to the web browser 302. The print script screen 540 refers to a script including the printer URL 613, the job ID 601, and the printer ID 605 as print request commands. The print script screen 540 is a screen viewable in a development tool mode of the web browser 302.

In step S903, the request reception unit 411 of the pull print application 303 receives the print request from the web browser 302, and notifies the print data acquisition unit 412 of print request information. The print request information includes the job ID 601 and the printer ID 605. In step S904, the pull print application 303 stores the job ID 601 and the printer ID 605 included in the print request information as the job ID 631 and the printer ID 634 of the print queue information 630.

In the processing, the print data acquisition unit 412 transmits an issuance request for a permission token to the authentication server inquiry unit 413. The authentication server inquiry unit 413 transmits the issuance request for a permission token to the authentication server 103. In the processing, the authentication server inquiry unit 413 transmits a certificate granted by the authentication server 103 to the authentication server 103. The authentication server 103 verifies the certificate. If the certificate is successfully validated, the authentication server 103 issues a permission token and transmits the permission token to the authentication server inquiry unit 413. The authentication server inquiry unit 413 transmits the permission token to the print data acquisition unit 412. The print data acquisition unit 412 stores the permission token as the permission token 633 of the print queue information 630.

In step S905, the pull print application 303 responds to the web browser 302 that the print request is successful. In step S906, the web browser 302 notifies the print server 101 of the success (print request completion notification). Specifically, the success here refers to that the pull print application 303 receiving the print request has completed print preparation processing. The pull print application 303 notifies the web browser 302 of the completion.

The print job management 406 receives the print request completion notification via the web server 401 of the print server 101. In step S907, the print job management unit 406 changes the status 625 of the document information 620 from "on standby" to "in print queue".

In step S908, the web browser 302 transmits a document list request to the print server 101. In step S909, the print server 101 generates a document list screen 510 based on the document information 620, and transmits the document list screen 510 to the web browser 302. The status 513 on the generated document list screen 510 (FIG. 5B) is "in print queue". The processing procedure when the printer A 104 starts print processing has been described above.

<Conversion Processing into Print Data and Generation Processing of Index File>

Data conversion processing into print data and generation processing of an index file will be described. This processing is mainly performed by the print server 101.

If the print data management unit 408 of the conversion server 403 receives a print data conversion request from the control server 402, the print data management unit 408 downloads the document data from the document URL 624 on the storage server 102. The data conversion unit 409 then converts the document data into print data in consideration of the configuration information 614. The data conversion unit 409 generates a plurality of pieces of print data in a file form based on document data size. Processing for uploading the print data files will be described below with reference to FIG. 11. While print data in a file form is referred to as a print data file, print data itself refers to that of any form including a file form.

After the data conversion unit 409 generates a certain number of print data files, the print data management unit 408 generates print data file URLs for the generated print data files. The print data files are uploaded to storage locations identified by the print data file URLs. In this processing, the print data management unit 408 converts the format of the print data files based on the compression method 615, and uploads the result to the storage server 102.

The print data management unit 408 generates an index file describing the print data file URLs. The generated index file is uploaded to a storage location identified by the index file URL 606 on the storage server 102.

The print data management unit 408 transmits the index file URL 606 to the control server 402. The control server 402 registers the index file URL 606 into the job information 600 in the database 301. The data conversion unit 409 generates a print data file URL and an index file describing the print data file URL after a print data file included in a print job is generated. The conversion processing into print data and the generation processing of an index file have been described above.

<Print Processing Flow>

Print processing by the print server 101, the pull print application 303, and the printing apparatus control unit 304 according to the embodiment of the present invention will be described with reference to FIG. 10.

In step S911, the print server 101 that has received a print request in step S901 starts processing for converting document data into print data (data conversion processing).

In step S912, the print server 101 uploads a print data file generated by the data conversion processing to the storage server 102 when needed. According to the present embodiment, the print data file (1) is uploaded here.

In step S913, the print server 101 generates an index file and uploads the index file to the storage server 102. Since the print data file (1) is uploaded in step S912, a corresponding index file 701 is generated here. In FIG. 10, an index file (1) (701 in FIG. 7) corresponding to the print data file (1) is uploaded.

In step S914, the print data acquisition unit 412 of the pull print application 303 that has received the print request transmits an acquisition request for an index file URL to the print server 101. The index file URL is acquisition source information about the index file (1). The print data acquisition unit 412 also transmits a job ID 631, a printer ID 634, and a permission token 633. In step S915, the print server 101 changes the status 625 of the document information 620 to "printing".

In step S916, the print server 101 identifies the index file URL 606 from the job information 600 using the received job ID 631 and printer ID 634, and transmits the index file URL 606 to the pull print application 303.

The print data acquisition unit 412 of the pull print application 303 stores the index file URL 606 into the index file URL 632 as the print queue information 630.

In step S916, if the data conversion processing (step S911) is not started yet and the index file URL 606 is not generated yet, the print server 101 transmits a busy response to the pull print application 303. The pull print application 303 that has received the busy response transmits an acquisition request for an index file URL again after an interval. The pull print application 303 transmits an acquisition request for an index file URL at regular time intervals until the index file URL 606 is obtained.

In step S919, the pull print application 303 establishes a communication session for obtaining an index file with the storage server 102, and generates a print data file acquisition communication stream 801.

In step S920, after the communication session is established, the print data acquisition unit 412 of the pull print application 303 accesses the index file URL 632 and downloads the index file (1) from the storage server 102. The data conversion processing in step S911 and print data file acquisition processing in step S921 are performed in an asynchronous manner. While the data conversion processing is described to be performed before the print data file acquisition processing, the print data file acquisition processing can be performed before the data conversion processing. The reason is that the data conversion processing based on print requests takes a long time if a lot of print requests are transmitted to the print server 101.

In step S917, after the print data file (1) and the index file (1) are uploaded by the processing of steps S912 and S913, the print server 101 generates a new print data file (2) and uploads the print data file (2) to the storage server 102. In step S918, the print server 101 uploads an updated index file (1) 701 (702 in FIG. 7) to the storage server 102.

In step S921, the pull print application 303 that has downloaded the index file (1) (701 in FIG. 7) in step S920 starts to download the print data file (1) from the storage server 102. The print data acquisition unit 412 obtains the print data file (1) using the print data file URL described in the index file (1) 701 obtained in step S920.

The index file will be described with reference to FIG. 7. If an end flag 703 of the index file is false, the end flag 703 indicates the data conversion processing by the print server 101 is in process and a print data file URL or URLs will be added to the index file. Since the index file (1) 701 obtained in step S920 does not include the URL of the print data file (2) yet, the end flag 703 is false.

If the end flag 703 is false, the print data acquisition unit 412 obtains the print data file (1) using the index file (1) 701, and then obtains the index file (1) from the storage server 102 again by repeating the processing of step S920 (not illustrated in FIG. 10).

If the end flag 703 is true, the end flag 703 indicates that the data conversion processing is completed. The print job transmission unit 416 closes the printer communication stream 802. Specifically, the pull print application 303 obtains the index file (1) 702 uploaded in step S918 (not illustrated), and closes the printer communication stream 802 since the end flag 703 of the obtained index file (1) 702 is true.

Return to the description of FIG. 10. In step S922, the pull print application 303 establishes a communication session with the printing apparatus control unit 304 and generates a printer communication stream 802.

In step S923, the pull print application 303 connects the print data file acquisition communication stream 801 and the printer communication stream 802 into one communication stream, and transmits the obtained print data file (1) to the printing apparatus control unit 304. The transmission to the printing apparatus control unit 304 in step S923 is implemented by writing the print data to the printer communication stream 802.

In step S926, the printing apparatus control unit 304 that has received the print data file (1) performs print processing.

Processing in a case where the print data file (1) is successfully downloaded in step S921 and the print data file (2) fails to be downloaded will be described with reference to step S924 and subsequent steps.

In step S924, the pull print application 303 becomes unable to communicate with the storage server 102 and the downloading of the print data file (2) results in an error. In step S925, the pull print application 303 notifies the print server 101 of the communication error. The communication error is not limited to the download timing of print data, and can occur at timing when the index file (1) 702 is obtained.

When notifying the print server 101 of the communication error, the pull print application 303 notifies the print server 101 of the number of obtained files and identification information of the files included in the print data file URL. For example, if an error occurs during downloading of the ninetieth print data file, the number of successfully-downloaded print data files (89 files) is notified to the print server 101. While, according to the present embodiment, the number of the print data files obtained by the printer is notified, such a configuration is not restrictive. For example, the number of the print data file (ninetieth file) failed to be obtained due to the communication error may be notified. Any information may be used as long as the print server 101 can identify which print data file on which the communication error occurs.

The print data management unit 408 of the print server 101 that has received the error notification determines the alternate storage server 111 serving as the alternative to the storage server 102 from the location of the printer A 104. The print data management unit 408 then identifies a print data file or files yet to be obtained and the number of print data files based on the number of obtained files notified, and uploads the print data file(s) yet to be obtained to the alternate storage server 111.

A method for determining the alternate storage server 111 will be described with reference to FIG. 12. This processing is mainly performed by the print server 101, and triggered by reception of the error notification in step S925.

In step S1101, the print server 101 checks an operation status of the storage server 102. In step S1102, the print server 101 determines whether the storage server 102 can communicate with the printer A 104. If the storage server 102 is determined to be able to communicate (YES in step S1102), the processing proceeds to step S1103. In step S1103, the print server 101 continues to use the storage server 102. If the storage server 102 is determined to be unable to communicate (NO in step S1102), the processing proceeds to step S1104. In step S1104, the print server 101 uses the alternate storage server 111 not only for the print data file (2) but for print data files generated after step S917 as well until the operation status and communication status of the storage server 102 are improved.

In step S1105, the print server 101 determines at regular time intervals whether the operation status of the storage server 102 is improved. The determination of step S1105 may be made at a preset time. The timing of determination is not limited in particular.

If the operation status is determined to not be improved (NO in step S1105), the processing proceeds to step S1104. That is, the processing of steps S1104 and S1105 is repeated until the operation status is determined to be improved. Meanwhile, if, in step S1105, the operation status of the storage server 102 is determined to be improved (YES in step S1105), the processing proceeds to step S1103. In step S1103, the print server 101 starts to use the original storage server 102 at the timing for the next print job or a print data file yet to be uploaded to the alternate storage server 111.

Return to the description of FIG. 10. In step S927, the print server 101 generates an index file (2) for obtaining the not-yet-obtained file (print data file (2)) from the alternate storage server 111. An example of such an index file (2) 704 is illustrated in FIG. 7. Since the print data file (2) is a not-yet-obtained file, the index file (2) 704 includes the print data file URL of the print data file (2). Since the not-yet-obtained print data file (2) is moved or copied from the storage server 102 to the alternate storage server 111, the print data file URL of the print data file (2) in the index file (2) 704 is different from that of the print data file (2) in the index file (2) 702. The print data file URL of the print data file (2) is generated by combining the file path of the print data file (2) in the alternate storage server 111 and the endpoint of the alternate storage server 111.

The print data file URL of a print data file is issued by the storage server 102 (or 111) if the print server 101 issues a URL issuance request to the storage server 102 (or 111). The print server 101 obtains and manages the issued print data file URL. An algorithm for issuing a print data file URL is set in the storage server 102 (or 111) in advance. For convenience of description, according to the present embodiment, the URL issuance request from the print server 101 and the processing for obtaining a URL from the storage server 102 (or 111) are described simply as "the print server 101 issues a URL".

In steps S928 and S929, the print data management unit 408 of the print server 101 uploads the print data file (2) and the index file (2) 704 to the alternate storage server 111.

In step S930, the print data management unit 408 of the print server 101 notifies the pull print application 303 of the index file URL of the index file (2) 704. The processing of step S930 corresponds to a response to the error notification from the pull print application 303 in step S925.

In step S931, the pull print application 303 establishes a communication session for obtaining the index file (2) 704 with the alternate storage server 111, and generates a print data file acquisition communication stream 803.

In step S932, the pull print application 303 downloads the index file (2) 704 from the alternate storage server 111. In step S933, the pull print application 303 downloads the print data file (2) from the alternate storage server 111 based on the index file (2) 704.

In step S934, the pull print application 303 writes the obtained print data file (2) to the printer communication stream 802.

In step S936, after the print data file (2) identified by the index file (2) is transmitted to the printing apparatus control unit 304, the pull print application 303 closes the printer communication stream 802. In step S937, the printing apparatus control unit 304 transmits a print completion notification to the pull print application 303. In step S935, the pull print application 303 also closes the communication session with the alternative storage server 111. The processing of steps S935 and S936 is triggered by the processing of step S934.

In step S938, the pull print application 303 receiving the print completion notification in step S937 transmits the print completion notification to the print server 101. In step S939, the print server 101 changes the status 625 of the document information 620 to "ended normally". If the print completion notification in step S937 indicates an error, the print server 101 changes the status 625 to "terminated with error". The print processing by the print server 101, the pull print application 303, and the printing apparatus control unit 304 has been described above.

<Upload Processing of Print Data Files>

A determination procedure in upload processing of print data files by the conversion server 403 will be described with reference to FIG. 11. In step S1001, the conversion server 403 obtains document data from the storage server 102. In step S1002, the conversion server 403 performs data conversion processing. In step S1003, as a result of the data conversion processing in step S1002, the conversion server 403 determines whether the document data targeted for the data conversion processing exceeds 256 KB in size and whether document data to be targeted for the data conversion processing is absent. If it is determined that the document data targeted for the data conversion processing does not exceed 256 KB in size and document data to be targeted for the data conversion processing exists (NO in step S1003), the processing returns to step S1002. The determination condition in the processing of step S1003 is not limited thereto. For example, the threshold of the document data size may be an arbitrary value. The number of pages of the document data may be used as a threshold instead of data size.

In step S1003, if it is determined that the document data targeted for the data conversion processing exceeds 256 KB in size or document data to be targeted for the data conversion processing is absent (YES in step S1003), the processing proceeds to step S1004. In step S1004, the conversion server 403 generates a print data file URL and writes the print data file URL into an index file. The conversion server 403 then uploads the print data file and the index file to the storage server 102. The first print data file among print data files included in the document data is thereby uploaded to the storage server 102.

In step S1005, the conversion server 403 determines whether document data to be targeted for the data conversion processing exists. If it is determined that document data to be targeted for the data conversion processing exists (YES in step S1005), the processing proceeds to step S1006. In step S1006, the conversion server 403 continues to perform the data conversion processing. In step S1007, the conversion server 403 determines whether the document data targeted for the data conversion processing exceeds, for example, 1 MB in size and whether document data to be targeted for the data conversion processing is absent. If the document data targeted for the data conversion processing is determined to exceed 1 MB in size or document data to be targeted for the data conversion processing is determined to be absent (YES in step S1007), the processing proceeds to step S1008. In step S1008, the conversion server 403 generates a print data file URL and additionally writes the print data file URL to the index file. The conversion server 403 uploads the updated index file and the print data file to the storage server 102.

In step S1007, if it is determined that the document data targeted for the data conversion is 1 MB or less in size or document data to be targeted for the data conversion processing exists (NO in step S1007), the processing returns to step S1006. In step S1009, after the upload to the storage server 102 in step S1008, the conversion server 403 determines whether document data to be targeted for the data conversion processing exists. If it is determined that document data to be targeted for the data conversion processing is absent (NO in step S1009), the data conversion processing ends. In step S1009, if it is determined that such document data exists (YES in step S1009), the processing returns to step S1006.

By the processing of the foregoing steps S1005 to S1009, the second and subsequent print data files are uploaded to the storage server 102. The determination condition in step S1007 is not limited thereto.

In the determination procedure illustrated in FIG. 11, the threshold of a document data size in uploading the first print data file is set lower than the threshold of a document data size in uploading the second and subsequent print data files. The reason is to accelerate the first printing of the submitted document data by setting the threshold in uploading the first print data file to a smaller value. While the thresholds for the second and subsequent print data files are uniformly set to "1 MB" according to the present embodiment, the threshold of a document data size in step S1007 may be increased for print data files which are generated at a later timing.

The print data conversion flow of the conversion server 403 has been described above. The print server 101 can thus immediately transmit converted data to the printer A 104, whereby first printing can be accelerated.

According to the present embodiment, first printing can be accelerated, and the print processing can be performed using completed print page files. In addition, the pull print application 303 can transmit the print data to the printing apparatus control unit 304 without disconnecting the communication session.

In the print processing system executing first printing, the print processing can be continued even if an error occurs when a printer obtains print data. The print processing can be performed as a single job even if the connected storage server is changed due to an error.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-033761, filed Feb. 27, 2018, which is hereby incorporated by reference herein in its entirety.

What is claimed is:

1. A print processing system comprising:
a print server configured to convert document data into print data including a plurality of print data files;
a first storage server;
a second storage server; and
an image processing apparatus configured to obtain the print data files and execute print processing,
wherein the print server comprises
a generation unit configured to generate an index file in response to an error occurring in processing for obtaining the print data files from the first storage server, the index file including acquisition source information about a print data file not yet obtained by the image processing apparatus, and
a storing unit configured to store the not-yet-obtained print data file into the second storage server, and
wherein the image processing apparatus comprises
an application configured to obtain a print data file from a storage server via a first communication stream, and
a controller configured to obtain a print data file from the application via a second communication stream and perform print processing,
wherein, in response to the error occurring, a connection destination to which the application is connected via the first communication stream is switched from the first storage server to the second storage server while maintaining a state of connection between the application and the controller via the second communication stream.

2. The print processing system according to claim 1, wherein the information notified by the notification unit includes a number of print data files having been obtained by the image processing apparatus.

3. The print processing system according to claim 1, wherein the acquisition source information is a Uniform Resource Locator (URL) including a file path to the print data file stored by the storing unit and an endpoint of the second storage server.

4. The print processing system according to claim 1, wherein the execution unit is configured to transmit the print data files to a controller and to execute the print processing, using a continuous communication session implemented by a first communication stream through which the image processing apparatus is configured to obtain the print data files from the first storage server and a second communication stream through which the print data files are transmitted to the controller, the controller being included in the image processing apparatus and configured to execute the print processing.

5. The print processing system according to claim 4, further comprising a checking unit configured to check an operation status of the first storage server, wherein, in a case where the first storage server and the image processing apparatus are determined to be able to communicate as a result of checking of the operation status of the first storage server by the checking unit, the print processing is executed using the communication session implemented by the first communication stream and the second communication stream.

6. The print processing system according to claim 5, wherein if the first storage server and the image processing apparatus are determined to be unable to communicate as the result of the checking of the operation status of the first storage server by the checking unit, the print processing is executed using the communication session implemented by the second communication stream and the third communication stream.

7. The print processing system according to claim 1, wherein the storing unit is further configured to store the plurality of print data files in the first storage server, wherein the print server further includes a determination unit configured to determine whether a data size of the document data converted into the print data files exceeds a preset threshold of data size, and wherein, in a case where the determination unit determines that the data size does not exceed the threshold, the storing unit is configured to not store the print data files into the storage servers.

8. The print processing system according to claim 7, wherein the preset threshold of data size is set in such a manner that a threshold for document data from which a first print data file to be stored into the storage servers is generated is lower than a threshold for document data from which a second and subsequent print data files are generated.

9. The print processing system according to claim 1, wherein the image processing apparatus further comprises a notification unit configured to notify the print server of information identifying the not-yet-obtained print data file, in response to the error occurring in the processing for obtaining the print data files from the first storage server.

10. A method for controlling a print processing system, the print processing system including:
a print server configured to convert document data into print data including a plurality of print data files;
a first storage server;
a second storage server; and
an image processing apparatus configured to obtain the print data files and execute print processing,
the method comprising:
generating, by the print server, an index file in response to an error occurring in processing for obtaining the print data files from the first storage server, the index file including acquisition source information about a print data file not yet obtained by the image processing apparatus;
storing, by the print server, the not-yet-obtained print data file into the second storage server;
obtaining a print data file from a storage server via a first communication stream; and
obtaining a print data file from the application via a second communication stream and perform print processing, wherein, in response to the error occurring, a connection destination to which the application is connected via the first communication stream is switched from the first storage server to the second storage server while maintaining a state of connection between the application and the controller via the second communication stream.

* * * * *